United States Patent [19]

Oglesby

[11] Patent Number: 5,296,210
[45] Date of Patent: Mar. 22, 1994

[54] STABILIZED SODIUM DITHIONITE

[75] Inventor: Donald M. Oglesby, Virginia Beach, Va.

[73] Assignee: Hoechst Celanese Corporation, Somerville, N.J.

[21] Appl. No.: 998,983

[22] Filed: Dec. 31, 1992

[51] Int. Cl.⁵ .......................................... C01B 17/66
[52] U.S. Cl. ...................................... 423/275; 423/515
[58] Field of Search ............................. 423/515, 275

[56] References Cited

U.S. PATENT DOCUMENTS

| | | | |
|---|---|---|---|
| 869,655 | 10/1907 | Rinckenberger | 423/515 |
| 3,054,658 | 9/1962 | Franklin et al. | 23/116 |
| 3,287,276 | 11/1966 | Poschmann et al. | 252/105 |
| 3,666,400 | 5/1972 | Lofton et al. | 8/115 |
| 3,794,738 | 2/1974 | Ellis et al. | 423/515 |
| 3,856,696 | 10/1972 | Stanbank et al. | 252/188 |
| 3,923,960 | 9/1973 | Leigh | 423/265 |
| 4,102,803 | 7/1978 | Fujishima et al. | 423/515 |
| 4,108,960 | 8/1976 | Leigh | 423/265 |
| 5,112,588 | 5/1992 | Staudinger et al. | 423/244.07 |

FOREIGN PATENT DOCUMENTS

| | | |
|---|---|---|
| 2052522 | 5/1971 | Fed. Rep. of Germany ...... 423/515 |
| 43-24774 | 10/1968 | Japan . |
| 46-16659 | 5/1971 | Japan . |
| 46-38408 | 11/1971 | Japan . |
| 7397 | of 1904 | United Kingdom ................ 423/515 |
| 26380 | of 1906 | United Kingdom ................ 423/515 |
| 1040687 | 9/1966 | United Kingdom . |
| 1259121 | 1/1972 | United Kingdom . |
| 1262560 | 2/1972 | United Kingdom . |
| 1287699 | 9/1972 | United Kingdom . |
| 1374029 | 11/1974 | United Kingdom . |
| 1415837 | 11/1975 | United Kingdom . |
| 1448208 | 9/1976 | United Kingdom . |
| 1469234 | 4/1977 | United Kingdom . |

Primary Examiner—Wayne Langel
Attorney, Agent, or Firm—Rosemary M. Miano

[57] ABSTRACT

A process for stabilizing sodium dithionite is disclosed, whereby a selected additive is used.

9 Claims, 2 Drawing Sheets

STABILIZED SODIUM DITHIONITE

This invention relates to improving the stability of sodium dithionite by adding one or more substances that remove water and scavenge protons.

BACKGROUND OF THE INVENTION

Commercial grade sodium dithionite ($Na_2S_2O_4$) (also called sodium hydrosulfite) generally has an assay of approximately 90 percent. Some of the impurities making up the other 10 percent have the effect of lowering the thermal stability of the product. For example, the temperature at which very pure sodium dithionite begins exothermic decomposition, as measured by Accelerating Rate Calorimetry, is approximately 150 degrees C. The typical temperature at which commercial grade sodium dithionite decomposes is around 80 degrees C. An increase in the concentration of certain impurities (such as water) can cause the temperature at which thermal decomposition begins to be even lower. It is important that the temperature at which decomposition begins be as high as possible, since conditions during handling, storage, or shipping may cause the temperature of the material to become sufficiently elevated to initiate rapid exothermic decomposition and fire. Sample temperature elevation may be caused by high ambient temperature such as that which occurs in warehouses or trucks during hot weather. Sample temperature elevation may also be caused by water contamination. Even a small increase in the temperature at which decomposition begins can improve the overall stability of a sample of sodium dithionite.

It is believed that a major cause of the lowered thermal stability of some sodium dithionite materials are proton donors (such as Bronsted acids) or substances which can increase the availability of protons in the sodium dithionite. In commercial grade sodium dithionite the most common source of protons is water. However, sodium metabisulfite is also a major impurity (usually around 6 percent). Sodium metabisulfite decomposes to produce sulfur dioxide ($SO_2$) which reacts with water to form sulfurous acid, thus increasing the availability of protons. The partial pressure of $SO_2$ formed from sodium metabisulfite increases with an increase in temperature, causing an increase in acidity and in turn a decrease in the thermal stability of sodium dithionite. Also, $SO_2$ is a decomposition product of sodium dithionite, which means that in the presence of even small amounts of water the decomposition is autocatalytic. Historically, many different additives have been tried in an effort to improve the stability of sodium dithionite. All of these additives have been solids, with sodium carbonate ($Na_2CO_3$) being the most widely used.

U.S. Pat. No. 3,054,658 to Franklin et al describes the use of sodium or potassium salts of carboxylic acids to improve the stability of $Na_2S_2O_4$.

Japanese Patent No. 43-24774 to Noguchi describes a method for improving the stability of $Na_2S_2O_4$ which includes the use of recrystallization, filtration and drying steps and the use of surface-active agents such as sodium dodecyl benzene sulfate sodium stearate and sodium sulfite.

British Patent No. 1,040,687 describes the use of suberic acid, azelaic acid, sebacic acid (including salts thereof and mixtures thereof) as improving the stability of sodium dithionite toward air oxidation at room temperature.

U.S. Pat. No. 3,287,276 to Poschmann et al describes the use of water soluble macromolecular substances as additives to inhibit the decomposition of sodium dithionite. Examples of such substances include poly(meth)acrylic acid, poly(meth)acrylamide, polyvinyl alcohol, polyethylenimine, polyvinylpyrrolidone and water soluble polyacetals.

Japanese Patent No. 1971-16,659 to Fujiwara et al describes the use of alkylene oxides such as ethylene oxide, propylene oxide or beta-butylene oxide to improve the stability of sodium dithionite against decomposition when exposed to air and moisture.

Japanese Patent No. 1971-38,408 to Toda et al claims that sodium dithionite can be stabilized by washing it with a methanol solution of sulfur dioxide or sulfurous acid.

British Patent No. 1,259,121 describes the use of amphoteric or nonionic surfactants such as polyoxyethylene alkyl esters, polyoxyethylene alkaryl and alicyclic aryl ethers to stabilize sodium dithionite against loss of assay upon storage.

U.S. Pat. No. 3,666,400 and British Patent No. 1,262,560 to Lofton et al. describe the use of amines or quaternary aliphatic ammonium salts to improve the storage stability of sodium dithionite. The patent claims that the amine functional group serves to scavenge protons on the surface of the dithionite while the alkyl chain makes the sodium dithionite hydrophobic.

British Patent No. 1,287,699 to Mitsui Toatsu Chemicals Inc. claims that coating the sodium dithionite with oxypropylated cellulose or oxypropylated starch at the stated levels improves the storage stability of the sodium dithionite.

U.S. Pat. No. 3,794,738 to Ellis et al. discusses the addition of alkali metal and ammonium salts of diglycolic acid to stabilize sodium dithionite against self-ignition when the sample is contaminated with water.

British Patent No. 1,374,029 to BASF Aktiengesellschaft utilizes a combination of anhydrous sodium carbonate and penta-sodium diethylene triaminopentaacetate to stabilize sodium dithionite against self-ignition when contaminated with water.

U.S. Pat. No. 3,856,696 and British Patent No. 1,415,837 to Stanbank et al. describe the addition of an unsaturated carboxylic acid or anhydride thereof to stabilize alkali and alkaline metal dithionites against self-ignition. Preferred acids are aryloxy alkanoic acids.

U.S. Pat. No. 3,923,960 and British Patent No. 1,448,208 to Leigh teaches that an anhydrous dithionite composition may be rendered resistant to ignition (after contamination with water) by adding a carboxylic acid salt of a primary, secondary or tertiary amine having at least one hydrocarbon group of at least five carbon atoms.

U.S. Pat. No. 4,108,960 and British Patent No. 1,469,234 to Leigh describe the use of aromatic carbonyl compounds such as vanillin, ethylvanillin or benzoin to stabilize metal dithionites against self-ignition.

Additives in current use are limited in their ability to remove water and other impurities such as sulfur dioxide which can cause an increase in the availability of protons. Additionally, throughout the previous attempts to find stabilizers for sodium dithionite it has been recognized that sodium carbonate alone is not sufficient as a single additive. The number and diversity of the compounds described above indicates that there remains a need for more effective ways of stabilizing sodium dithionite. Thus, it is an object of the present invention to provide stabilized sodium dithionite materials so that it is less likely to undergo rapid exothermic decomposition when exposed to air and moisture. It is another object of this invention to stabilize commercial grade sodium dithionite so that it is less likely to burn if the temperature becomes elevated during storage. It is a further object of this invention to provide such stabilized materials with the use of relatively inexpensive additives. These and further objects of the invention will become apparent from the following description of the invention.

SUMMARY OF THE INVENTION

Alkaline desiccants or desiccants in combination with alkaline additives as described below are effective stabilizers of sodium dithionite.

DETAILED DESCRIPTION OF THE INVENTION AND DESCRIPTION OF THE PREFERRED EMBODIMENTS

It has been found that an effective way of stabilizing sodium dithionite is to add one or more materials which alone or in combination have the properties of being a potent desiccant and a vigorous proton scavenger.

This invention comprises a method for stabilizing sodium dithionite which comprises mixing from 0.5 percent by weight to 5 percent by weight (based on the amount of sodium hydrosulfite), especially 0.5 to 4 percent by weight of a member of the group consisting of:
a) calcium oxide;
b) barium oxide;
c) a mixture of calcium sulfate and sodium carbonate;
d) a mixture of silica gel and sodium carbonate;
e) a mixture of aluminum oxide and sodium carbonate; and
f) a mixture of calcium oxide and barium oxide.

Figure 1:
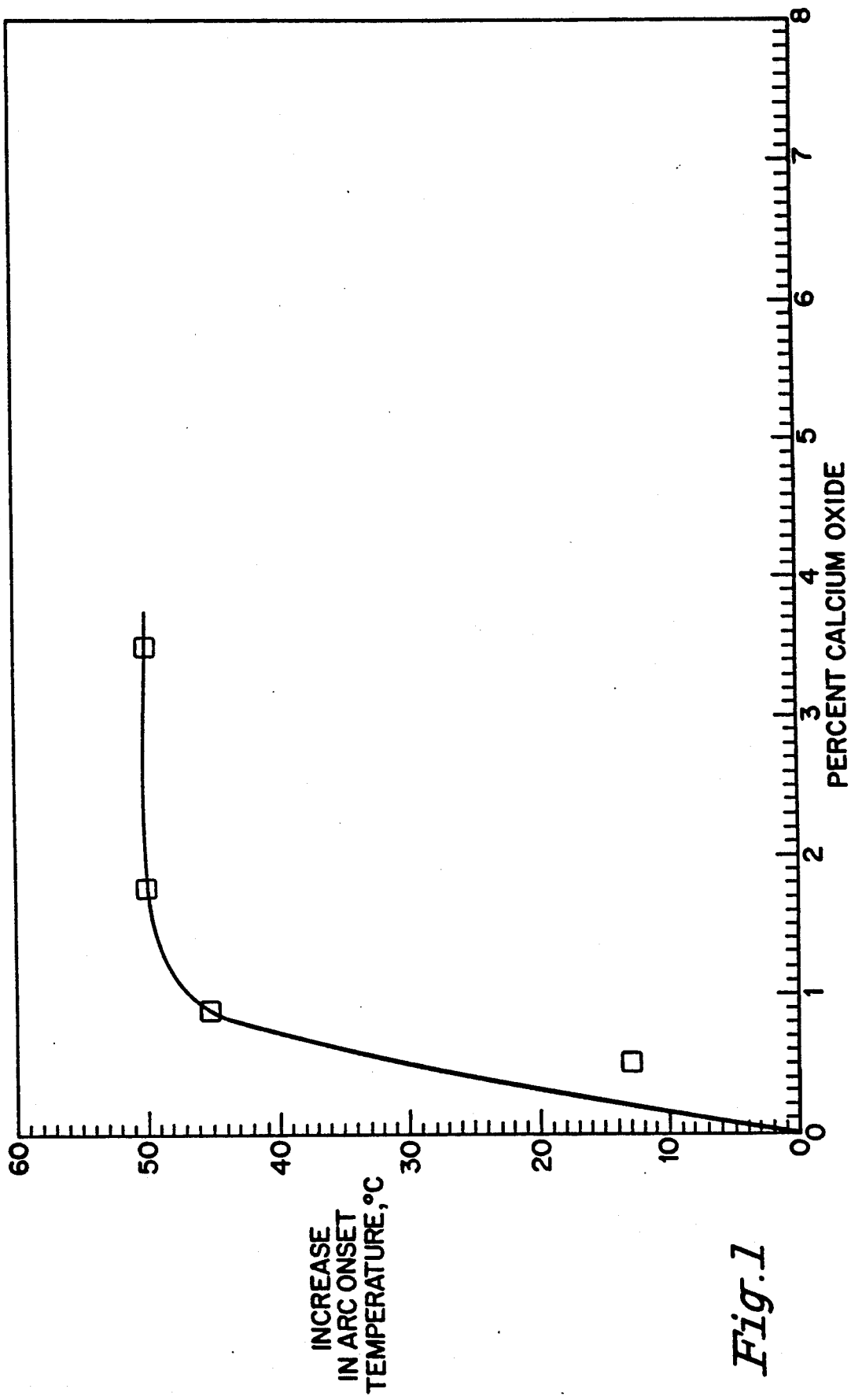
FIG. 1 shows the increase in thermal stability of commercial grade sodium dithionite as a function of calcium oxide added in the preferred range of 0.5-3% by weight.
Figure 2:
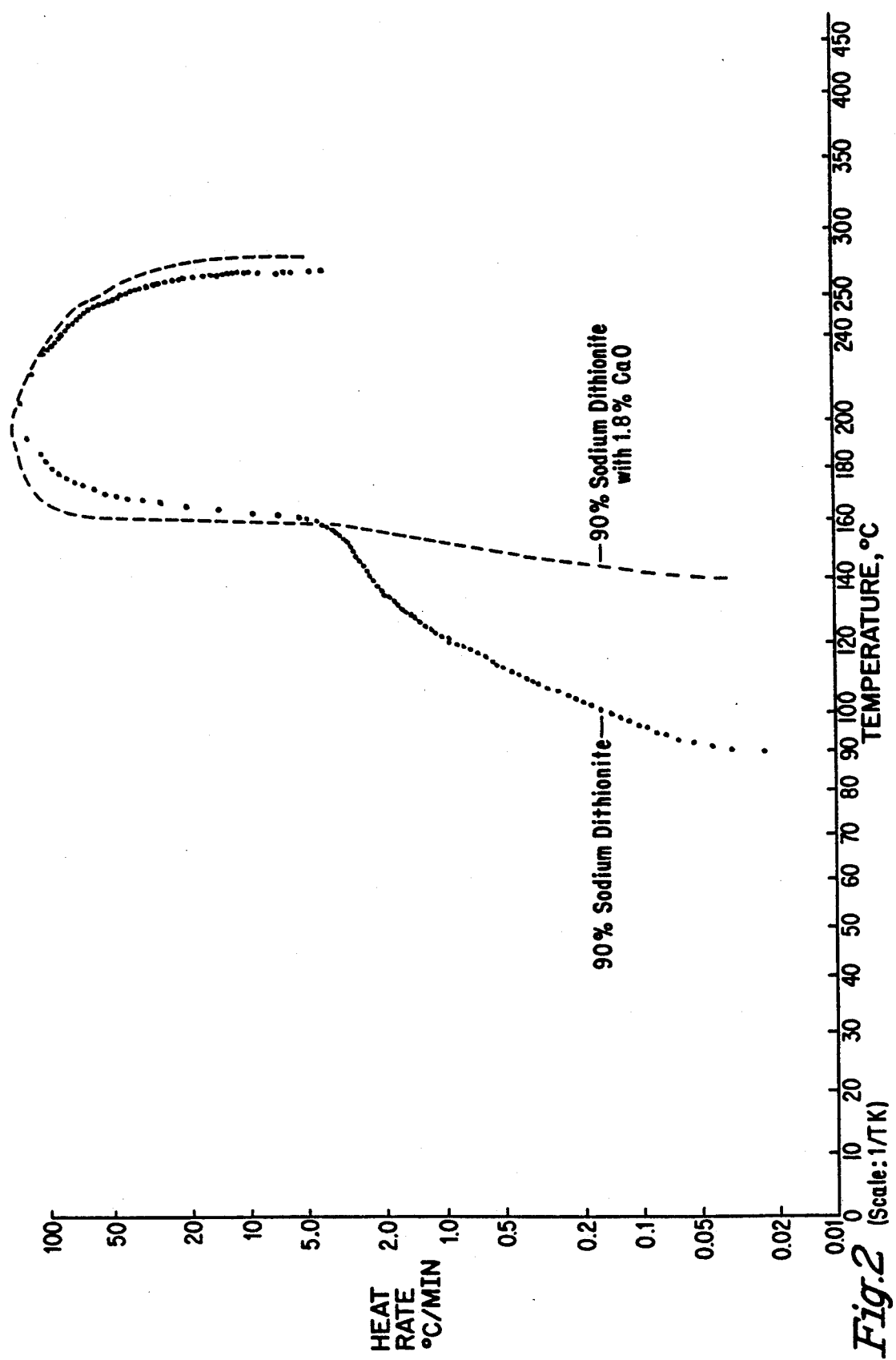
FIG. 2 shows a comparison between the ARC self-heat rate curve for 90 percent sodium dithionite with and without calcium oxide. Temperatures are in degrees Centigrade (°C.), but the scale is 1/Temperature, where temperature (T) is in the Kelvin scale.

Each of the additives listed above has an optimum concentration for achieving the maximum benefit (thermal stability). FIG. 1 illustrates the relationship between the increased thermal stability and the percentage of additive in the blend for blends of the preferred range (0.5-3% by weight) calcium oxide in commercial grade sodium dithionite. The preferred range for $CaSO_4$ is 1-5% by weight. The preferred range for BaO is 0.5-3% by weight. Those skilled in the art will appreciate that optimizing the exact amount of a selected additive for a selected grade of sodium dithionite may be readily done.

The stabilizing agent should be evenly distributed throughout the sodium dithionite and present at all surfaces during decomposition in order to maximize the effect of the additive. This is also an important consideration in view of the catalytic effects of thermal decomposition products such as sulfur dioxide on the sodium dithionite.

The method of this invention is suitable for use with a variety of grades and purities of sodium dithionite, but will most typically be used with commercial grades of material such as in the range of 90 percent purity.

EXAMPLES

The following non-limiting examples are offered to illustrate the invention. Unless stated otherwise, all percentages are by weight and chemical terminology is used in its customary way. It should be noted that the maximum temperature elevation achieved in laboratory experiments was 50°±3° C.

EXAMPLE 1

A sample (laboratory scale, less than 100 grams) of commercial grade sodium dithionite (90% assay, Virtex® D, Hoechst Celanese Corporation, Somerville, N.J.) was blended with sufficient dry powdered calcium oxide to cause the final mixture to be 1.78 percent calcium oxide. The blend was then placed in a 1 inch (25.4 millimeter) diameter titanium sample container designed for an accelerating rate calorimeter (ARC) (Columbia Scientific Industries, Austin, Tex.). The container and sample were connected in the ARC in accordance with the requirements for running the ARC test under adiabatic conditions. The temperature of the sample in the calorimeter was slowly increased until self-heating of the sample was detected. (The temperature range to be examined was selected and programmed into the ARC, which automatically controls temperature and maintains the sample under adiabatic conditions.) The temperature at which self-sustained thermal decomposition began was approximately 50 degrees C. higher than the same untreated commercial grade sodium dithionite. FIG. 1 shows a comparison between the ARC self-heating rate curve for sodium dithionite with and without the CaO.

EXAMPLE 2

A sample of commercial grade sodium dithionite of the type described in Example 1 (laboratory scale, less than 100 grams) was blended with sufficient dry powdered calcium oxide to cause the final mixture to be 0.90 percent calcium oxide. The blend was then tested by the same method as described in Example 1. The temperature at which self-sustained thermal decomposition began was approximately 45 degrees C. higher than the same untreated commercial grade sodium dithionite.

EXAMPLE 3

A sample of commercial grade sodium dithionite of the type described in Example 1 (laboratory scale, less than 100 grams) was blended with sufficient dry powdered calcium oxide to cause the final mixture to be 3.51 percent calcium oxide. The blend was then tested by the same method as described in Example 1. The temperature at which self-sustained thermal decomposition began was approximately 50 degrees C. higher than the same untreated commercial grade sodium dithionite.

EXAMPLE 4

A sample of commercial grade sodium dithionite of the type described in Example 1 (laboratory scale, less than 100 grams) was blended with sufficient dry powdered barium oxide (90% Technical Grade, Aldrich) to cause the final mixture to be 1.97 percent barium oxide. The blend was then tested by the same method as described in Example 1. The temperature at which self-sustained thermal decomposition began was approximately 52.8 degrees C. higher than the same untreated commercial grade sodium dithionite.

EXAMPLE 5

A sample of commercial grade sodium dithionite of the type described in Example 1 (laboratory scale, less than 100 grams) was blended with sufficient dry powdered barium oxide (90% Technical Grade, Aldrich) to cause the final mixture to be 4.07 percent barium oxide. The blend was then tested by the same method as described in Example 1. The temperature at which self-sustained thermal decomposition began was approximately 54 degrees C. higher than the same untreated commercial grade sodium dithionite.

EXAMPLE 6

A sample of commercial grade sodium dithionite of the type described in Example 1 (laboratory scale, less than 100 grams) was blended with sufficient dry powdered calcium sulfate (99%, Aldrich) to cause the final mixture to be 4.05 percent calcium sulfate. The blend was then tested by the same method as described in Example 1. The temperature at which self-sustained thermal decomposition began was approximately 37.8 degrees C. higher than the same untreated commercial grade sodium dithionite.

EXAMPLE 7

A sample of commercial grade sodium dithionite of the type described in Example 1 (laboratory scale, less than 100 grams) was blended with sufficient anhydrous powdered calcium sulfate (99%, Aldrich) and dry powdered sodium carbonate to cause the final mixture to be 2.03 percent calcium sulfate and 2.00 percent sodium carbonate. The blend was then tested by the same method as described in Example 1. The temperature at which self-sustained thermal decomposition began was approximately 12 degrees C. higher than the same untreated commercial grade sodium dithionite.

What is claimed is:

1. A method for stabilizing sodium dithionite comprising mixing with said sodium dithionite from 0.5 percent by weight to 5.0 percent by weight of an additive selected from the group consisting of
   a) calcium oxide;
   b) barium oxide;
   c) a mixture of calcium sulfate and sodium carbonate;
   d) a mixture of silica gel and sodium carbonate;
   e) a mixture of aluminum oxide and sodium carbonate; and
   f) a mixture of calcium oxide and barium oxide.

2. A method as claimed in claim 1 wherein the additive used is from about 0.5 to about 4.0 percent by weight.

3. A method as claimed in claim 1 wherein the sodium dithionite has a purity of at least 90 percent.

4. A method as claimed in claim 2 wherein the sodium dithionite has a purity of at least 90 percent.

5. A method as claimed in claim 1 wherein the additive is mixed uniformly with the sodium dithionite.

6. A method as claimed in claim 2 wherein the additive is mixed uniformly with the sodium dithionite.

7. A method as claimed in claim 2 wherein the additive is from about 0.5 to about 3.0 weight percent of calcium oxide.

8. A method as claimed in claim 2 wherein the additive is from about 0.5 to about 3.0 weight percent of barium oxide.

9. A method as claimed in claim 1 wherein the additive is a mixture of calcium sulfate and sodium carbonate.

* * * * *